United States Patent [19]

Chen et al.

[11] Patent Number: 5,756,880

[45] Date of Patent: May 26, 1998

[54] METHODS AND APPARATUS FOR MONITORING WATER PROCESS EQUIPMENT

[75] Inventors: Haiwen Chen, Bethlehem, Pa.; Ke Hong, Kendall Park, N.J.

[73] Assignee: BetzDearborn Inc., Trevose, Pa.

[21] Appl. No.: 800,110

[22] Filed: Feb. 13, 1997

[51] Int. Cl.[6] ................................................. G01M 3/08
[52] U.S. Cl. ................................................................. 73/40
[58] Field of Search ........................... 237/8 R; 60/667; 122/382; 73/40.5 R, 452, 53.03, 40

[56] References Cited

U.S. PATENT DOCUMENTS

| | | | |
|---|---|---|---|
| 3,447,895 | 6/1969 | Nelson et al. | 23/48 |
| 3,994,174 | 11/1976 | Ekman | 73/452 |
| 4,428,328 | 1/1984 | Ratliff | 122/396 |
| 4,462,319 | 7/1984 | Larsen | 110/238 |
| 4,497,283 | 2/1985 | LaSpisa et al. | 122/451.1 |
| 4,498,333 | 2/1985 | Parthasarathy | 73/40.5 A |
| 4,502,322 | 3/1985 | Tero | 73/40.5 A |
| 4,777,009 | 10/1988 | Singh et al. | 376/211 |
| 4,783,314 | 11/1988 | Hoots et al. | 422/3 |
| 4,963,229 | 10/1990 | Lisnyansky et al. | 162/49 |
| 4,966,711 | 10/1990 | Hoots et al. | 210/697 |
| 5,041,386 | 8/1991 | Pierce et al. | 436/50 |
| 5,148,775 | 9/1992 | Peet | 122/451 R |
| 5,304,800 | 4/1994 | Hoots et al. | 250/302 |
| 5,320,967 | 6/1994 | Avallone et al. | 436/50 |
| 5,363,693 | 11/1994 | Nevruz | 73/40.5 R |
| 5,411,889 | 5/1995 | Hoots et al. | 436/6 |
| 5,416,323 | 5/1995 | Hoots et al. | 250/302 |
| 5,565,619 | 10/1996 | Thungstrom et al. | 73/40.7 |

OTHER PUBLICATIONS

"Black Liquor Recovery Boiler Advisory Committee Recommended Emergency Shutdown Procedure (ESP) and Procedure for Testing ESP System for Black Liquor Recovery Boilers", BLRBAC, Oct. 1993.

Buckner et al., "Design and Implementation of a Commerical Acoustic Leak–Detection System for Black Liquor Recovery Boilers", TAPPI Journal, 121, Jul., 1990.

Boyette et al., "An Automated Coordinated Phosphate/pH Controller for Industrial Boilers", Presented at NACE Corrosion '95, Mar., 1995.

Durham et al., "Black Liquor Recovery Boiler Leak Detection: Indication of Boiler Water Loss Using a Waterside Mass Balance Method", Presented at TAPPI '95, in Sep. 1995..

Clevett, K. J., Process Analyzer Technology, John Wiley & Sons, New York, 1986, 872–876.

Grace, T. M., "Acoustic Leak Detection—One Answer to a Need", PIMA, 53, Dec., 1988.

Racine et al., "An Expert System for Detecting Leaks in Recovery—Boiler Tubes", TAPPI Journal, 147, Jun., 1992.

Primary Examiner—Michael Brock
Assistant Examiner—Jay L. Politzer
Attorney, Agent, or Firm—Alexander D. Ricci; Philip H. Von Neida

[57] ABSTRACT

Methods and apparatus are provided for detection of leaks in boilers containing a temperature control liquid which is supplemented with feedwater and removed as blowdown, main steam and sootblower steam. In a preferred embodiment, the boiler has an automatic liquid level control mechanism. The methods include measuring rates associated with feedwater supplementation and removal, determining the change of mass of the temperature control liquid, determining the unaccounted for water rate, and comparing the unaccounted for water rate with zero to determine if a leak condition is present.

7 Claims, 1 Drawing Sheet

METHODS AND APPARATUS FOR MONITORING WATER PROCESS EQUIPMENT

FIELD OF THE INVENTION

The present invention is directed to methods and apparatus for monitoring industrial water process equipment. More particularly, the invention is directed to the detection of leaks in water process equipment such as black liquor recover boilers.

BACKGROUND OF THE INVENTION

A boiler is an apparatus in which water or some other aqueous temperature control liquid to which makeup water is added and from which blowdown is removed is vaporized into steam by the application of heat from a furnace or heat-generating process system. In most instances, the temperature control liquid is brought into close, indirect contact with the process system to facilitate heat transfer. Leakage in a boiler can result not only in contamination and fouling of the temperature control liquid and the process system, but also in undesired physical reactions. This is particularly true for the black liquor recovery boilers used in many paper mills. In black liquor recovery boilers, the escape or leakage of aqueous temperature control liquid from the so-called "water side" of the boiler into the hot, highly caustic "fire side" can result in violent explosions.

The prior art provides numerous techniques for monitoring and controlling leaks in black liquor recovery boilers and other boiler systems. For example, U.S. Pat. No. 5,320,967 (Avallone, et al.) discloses a boiler system leak detection method that involves introducing an inert tracer to the boiler in a known and uniform proportion to the feedwater, sensing a characteristic of the tracer in the boiler at steady state, converting the sensed characteristic to a value equivalent to the concentration of the tracer in the temperature control liquid, and activating a signal when there is excessive variance in the concentration of the tracer. However, the method disclosed by Avallone, et al. is limited by its requirement that the tracer be detected (sensed) when the boiler is at steady state, which is said to occur only when there is no significant change in any of five process parameters: the concentration of the tracer in the boiler; the blowdown rate; the feedwater rate; the rate of feeding tracer to the boiler; and the steaming rate in the absence of boiler leakage.

Further limitations include the costs of tracer chemicals and measuring equipment for both inputting tracer chemicals and for analyzing blowdown.

U.S. Pat. No. 5,363,693, Nevruz, teaches methods and apparatus for detecting leakage from chemical recovery boiler systems. The methods utilize measuring the mass input and output of a recovery boiler and calculating the long and short term statistics for the drum balance of mass flow. From these calculations a t-test function is calculated to see if both long term and short term moving average of drum balances are significantly different, which in turn indicates whether a boiler leak is occurring. Although this method provides corrections to sensor input caused by flow sensor drift and offset, it still suffers from serious offsets in the leak detection signal during changes in process parameters, namely steaming rate changes.

Consequently, there remains a need in the art for more flexible leak detection methods which can be employed in boiler systems that are not at steady state, that is, where one or more process parameters is subject to change.

SUMMARY OF THE INVENTION

The present invention provides for methods and apparatus for the detection of leaks in boilers to which a temperature control liquid is added and from which liquid is removed. In a preferred embodiment, the temperature control liquid is supplemented with feedwater and this rate of supplementation is measured. The temperature control liquid is also removed as blowdown, main steam and sootblower steam, and these rates of removal are also measured.

The change of mass of the temperature control liquid in the boiler can then be calculated from the derivative of the measurements relating to supplementation and removal. From this calculation, the unaccounted for water rate can be determined utilizing the known quantities of either supplementation or removal and the calculated change of mass of liquid in the boiler. A comparison of this derived amount with zero (i.e. the unaccounted for water rate is greater than 0) indicates that a leak condition is present in the boiler.

BRIEF DESCRIPTION OF THE DRAWINGS

The accompany

DETAILED DESCRIPTION OF THE INVENTION

Figure 1:
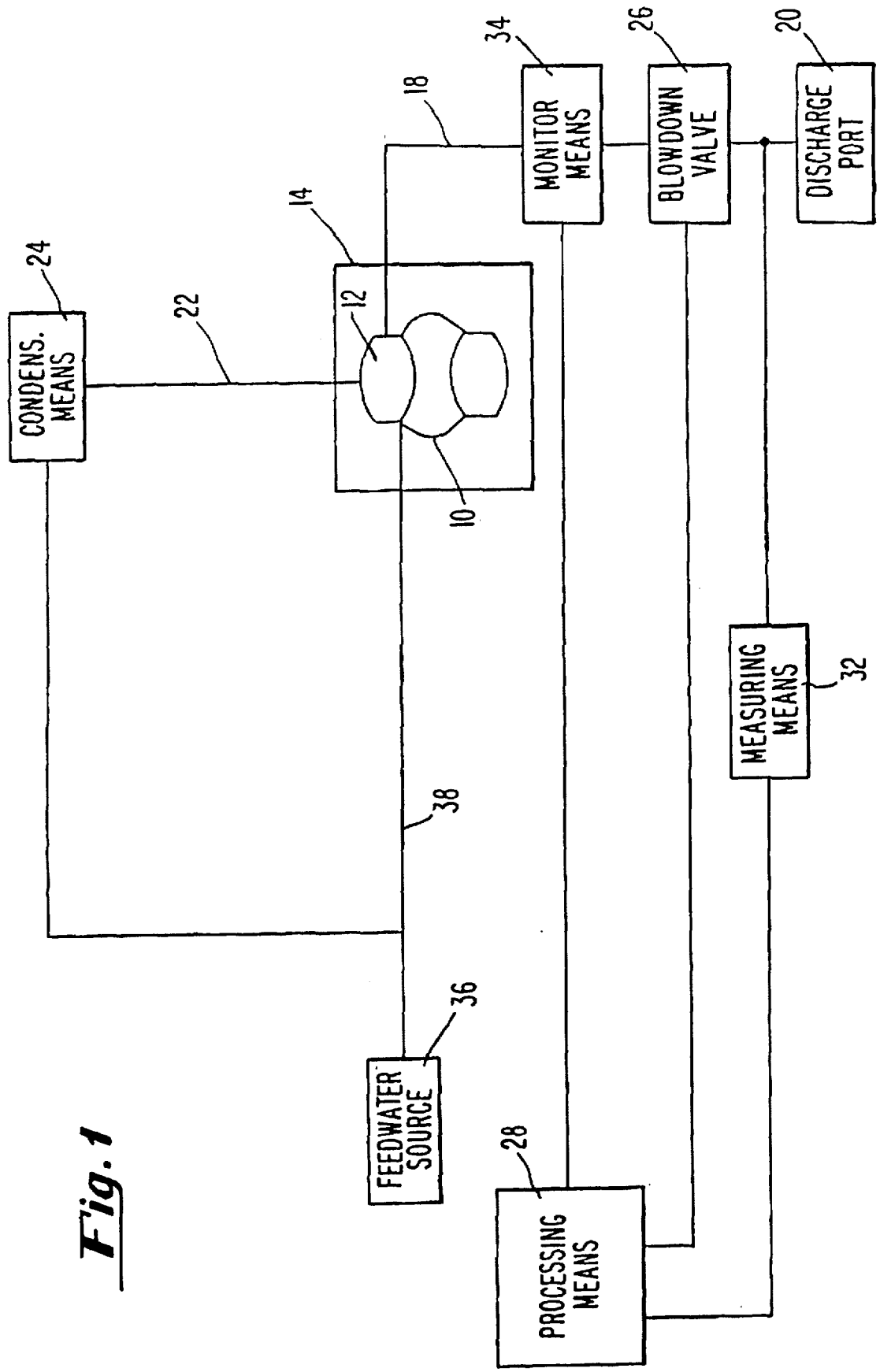
FIG. 1 is a schematic representation of a boiler monitoring system according to the invention.

The present invention provides for methods and apparatus for detecting a leak in a boiler having an automatic liquid level control mechanism in which a temperature control liquid in a containment means is supplemented with feedwater and is removed as blowdown, main steam, and sootblower steam comprising the steps of:

a) measuring a rate associated with said feedwater supplementation to obtain data;

b) measuring a rate associated with said blowdown, main steam, and sootblower steam removal to obtain data;

c) determining the change of mass of said temperature control liquid present in said containment means from the data derivative of the data obtained in either step (a) or step (b);

d) determining the unaccounted for water rate from the data obtained in steps (a) and (b) and the determination of change of mass in step (c);

e) comparing said unaccounted for water rate with zero;

f) indicating a leak condition if said unaccounted for water rate is greater than zero.

The present invention also provides an apparatus suitable for indicating leaks in boilers. Apparatus according to the invention comprise: measuring means in communication with feedwater supplementation means; measuring means in contact with blowdown, sootblower steam and main steam removal means; derivation means in communication with the measuring means for deriving the change of mass of the temperature control liquid; and derivation means in communication with the measuring means for deriving the unaccounted for water rate; and comparison means to determine if a leak condition exists.

The methods and apparatus of the present invention can be used to monitor virtually any type of equipment to which liquid is added and from which liquid is removed. The methods and apparatus of the invention preferably are used to monitor and detect leaks in boilers, especially black liquor recovery boilers. Representative boilers are disclosed by U.S. Pat. Nos. 3,447,895, Nelson et al.; 4,462,319, Larson; 4,438,333, Parthasarathy; and 4,502,322, Tero, the contents of which are incorporated herein by reference.

An exemplary monitoring system according to the invention is shown in FIG. 1, wherein a first "water side" containment means a "boiler" 10 containing temperature control liquid 12 is adjacent to and in thermal communication with a second "fire side" containment means 14 that typically contains hot vapors and a molten smelt bed. Boiler 10 is in fluid communication with blowdown line 18 for the discharge of blowdown to discharge port 20 and with steam line 22 for the discharge of steam to condensation means 24. The discharge of blowdown is controlled through actuation of blowdown value 26, which can be operated manually or under the control of an external computer or some other processing means (not shown). It is not necessary that the blowdown valve be under control of or monitored by the system of the invention. Between boiler 10 and valve 26, blowdown line 18 is in fluid communication with monitoring means 34 to provide information on the blowdown flow rate. Measuring means 32 and 34, in turn, are in electrical communication with processing means 28. Boiler 10 is also in fluid communication with feedwater source 36 via feed line 38.

During normal operation, the controlled addition of feedwater to boiler 10 compensates for the removal of blowdown and steam, and maintains a desired volume of temperature control liquid 12 within boiler 10. A natural consequence of steam generation in a boiler is a concentrating of incoming, non-volatile components. To control this "cycling up" effect, one or more volumes of the relatively-concentrated temperature control liquid typically are removed from the boiler as blowdown and corresponding volumes of relatively-dilute feedwater is added. In accordance with the present invention, the blowdown is measured at regular or irregular intervals or is continuously monitored to determine the weight of water removed as blowdown.

The methods of the present invention are particularly effective for those containment means having an automatic water level control mechanism. These mechanisms are found in boilers and function by way of sensing a change in the amount of volume of water present in the boiler. As water exits the boiler, the sensor indicates that the water level has dropped and signals such so that it may be automatically replenished.

In boiler systems having an automatic water level control mechanism, a coefficient $\alpha$ can be calculated using a least squares fit on historical boiler data. This "historical" data can be that gathered for roughly one month prior to applying the methods and apparatus of the present invention. The least squares fitting is a widely used mechanism for extracting meaning from a set of related observations. In the instance of a boiler, $\alpha$ can be calculated from an observation and gathering of liquid flow data into and out of the boiler using a least squares fit mechanism. This gathering of data also fits with the steps of the present invention as to the various rates measured. The coefficient $\alpha$ is particular to each boiler and will even vary from different boilers of the same model and manufacture.

The methods of the present invention further involve deriving the change of water mass in a containment means. The input rate of temperature control liquid as feedwater and the output rate of temperature control liquid as blowdown, main steam and sootblower steam can be measured either intermittently or continuously. From these measurements, the change of water mass and the unaccounted for water rate have the relationship:

$$dM/dt = I - O - U \qquad (1)$$

where:

M=Water mass contained

I=Water input rate (as feedwater)

O=Water output rate (as blowdown, main steam and sootblower steam)

U=Unaccounted water rate t=Time

In a boiler system, for example, where there is an automatic water level control mechanism, the following relationship between M and I exists:

$$M - M_o = \alpha \times I \qquad (2)$$

where:

$M_o$=nominal boiler water mass $\alpha$=a determinable constant

The determinable constant $\alpha$ is calculated from statistical data that is accumulated on the boiler. This data, even one month's worth, is utilized in a least square fit to calculate $\alpha$.

Typically the data used to calculate $\alpha$ is gathered in the normal course of operating the boiler. Application of the present invention can be made when there is at least one month's data available.

Taking derivatives of both sides of equation (2) yields the following equation:

$$dM/dt = \alpha \times dI/dt$$

Combining equations (1) and (3) yields the following relationships:

$$U = I - O - \alpha \times dI/dt$$

If the unaccounted water rate (U) is greater than zero (within a statistically-significant variance), a leak condition is indicated. Thus if U is a positive number, then the boiler operator initiates an investigation into the possible causes. This typically involves physical and/or acoustical examination of the boiler and, depending on the magnitude of the variance, complete shutdown of the boiler.

EXAMPLES

Data was gathered at a northeastern industrial boiler over a 50 hour period. During this period, feed water rate (I), steam rate and blowdown (O) were measured. $\alpha$ was calculated using historical data gathered from the boiler by the least squares fitting of the equation: I–O =$\alpha \times$change of feed water rate. This value for $\alpha$ was −5.

At one point during this period, the steam rate was reduced by 50%. This calculated leak, prior to correction, at this time was 8 k lb/hr which is considered a large leak. However, introduction of the correcting term, $\alpha \times dI/dt$, reduced the calculated leak to be 1 k lb/hr. This data demonstrates the large effect that steam rate load swing has on the simple equation: Leak=input - output, as well as, the contribution of the change of feed water rate to the methods of the present invention.

While this invention has been described with respect to particular embodiments thereof, it is apparent that numerous other forms and modification of this invention will be obvious to those skilled in the art. The appended claims and this invention generally should be construed to cover all such obvious forms and modifications which are within the true spirit and scope of the present invention.

Having thus described the invention, what we claim is:

1. A method for detecting a leak in a boiler having an automatic liquid level control mechanism in which a temperature control liquid in a containment means is supplemented with feedwater and is removed as blowdown, main steam and sootblower steam comprising the steps of:

a) measuring a water input rate associated with said feedwater supplementation to obtain data;

b) measuring a water output rate associated with said blowdown, main steam, and sootblower steam removal and adding these rates to obtain data;

c) determining the change of mass of said temperature control liquid present in said containment means by taking the derivative of said input rate with respect to time according to the formula:

$$dM/dt = \alpha \cdot dI/dt$$

where:

M=water mass contained;

t=time

I=water input rate, and

α=a determinable constant where α is calculated using a least squares fit of historical data of said boiler;

d) determining the unaccounted for water rate according to the formula:

$$U = I - O - \alpha \cdot dI/dt$$

where:

U=unaccounted for water rate;

I=water input rate;

O=water output rate;

α=a determinable constant; and dI/dt=the change in water input rate over time, t;

e) comparing said unaccounted for water rate with zero; and f) indicating a leak condition if said unaccounted for water rate is greater than zero.

2. The method as claimed in claim 1 wherein said rate in steps (a) and (b) is in weight per time unit.

3. The method as claimed in claim 1 wherein said boiler is a black liquor recovery boiler.

4. The method as claimed in claim 1 wherein said leak condition is indicated by electronic means.

5. The method as claimed in claim 1 wherein said measurements in steps (a) and (b) are by flow meters.

6. The method as claimed in claim 1 wherein said determinations in steps (c) and (d) are made by a computer.

7. The method as claimed in claim 1 further comprising physically analyzing said boiler when said unaccounted for water rate is greater than zero.

* * * * *